UNITED STATES PATENT OFFICE.

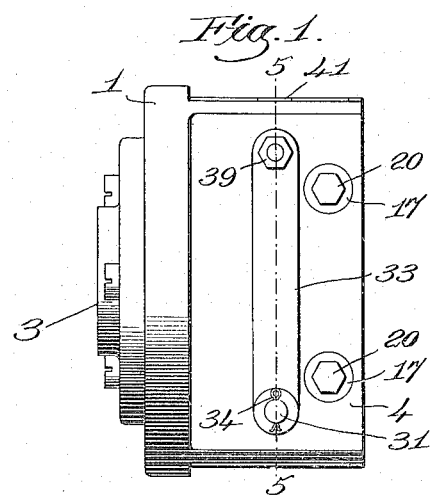

EDWARD RIVETT, OF BRIGHTON, MASSACHUSETTS, ASSIGNOR, BY MESNE ASSIGNMENTS, TO RIVETT LATHE AND GRINDER COMPANY, A CORPORATION OF MASSACHUSETTS.

SELF-CENTERING CHUCK.

1,135,397.      Specification of Letters Patent.      Patented Apr. 13, 1915.

Application filed March 9, 1912. Serial No. 682,584.

*To all whom it may concern:*

Be it known that I, EDWARD RIVETT, a citizen of the United States, and resident of Brighton, county of Suffolk, State of Massachusetts, have invented an Improvement in Self-Centering Chucks, of which the following description, in connection with the accompanying drawing, is a specification, like characters on the drawing representing like parts.

This invention has for its object the production of a very strong and powerful self-centering chuck particularly adapted for grasping and holding rigidly in a firm and secure manner bushings or other tubular objects for inside grinding or other manipulation which necessitates a rigid and accurate support for the work.

In my present invention the base of the chuck, which has a deep guideway for the radially movable jaws, is made very heavy and strong so that there will be no vibration or chattering, and the jaws are slidable simultaneously toward and from each other within the guideway, the jaws being sufficiently massive to securely grasp and rigidly hold the work, but without any danger of crushing or deforming it.

The movement of the jaws toward and from each other is effected by very simple but powerful and quick-action means, so constructed and arranged that the movement of the two jaws is simultaneous as to time and equal as to extent, whereby the work when clamped is always centered irrespective of slight variations in the external diameter of different pieces of work having substantially the same dimensions, the inward movement of the jaws being limited positively by the actuating means. Said actuating means is self locking, that is, when the jaws are set up to securely grasp the work they are so held by the actuating means, without further attention on the part of the operator.

I have provided separate means to clamp the jaws securely upon the chuck base when the jaws have been set upon the work, both the jaw actuating and jaw clamping means being operated easily and readily, and without a material expenditure of power on the part of the workman.

The foregoing and various other novel features of my invention will be fully described in the subjoined specification and particularly pointed out in the following claims.

While the chuck forming the subject matter is particularly adapted for holding tubular work for inside grinding or other accurate and precise manipulation it will be manifest that the use of the chuck is by no means restricted thereto, for it can be employed in any case where it is desirable to hold the work firmly, rigidly and powerfully without danger of deforming or crushing it.

Figure 1 is a side elevation of a chuck embodying one form of my present invention; Fig. 2 is a face view of the chuck, viewing Fig. 1 from the right, the jaws being retracted from each other; Fig. 3 is a vertical, diametral sectional view taken on the line 3—3, Fig. 2, in the direction of longitudinal movement of the jaws; Fig. 4 is a transverse sectional detail and part elevation of one of the chuck jaws and the means for clamping it in its guideway, the section being taken on the line 4—4, Fig. 2; Fig. 5 is a detail view partly in plan, and partly in section on the line 5—5, Fig. 1, of the means for effecting simultaneous opening and closing movement of the chuck jaws, the view being broken out centrally to save space; Fig. 6 is an enlarged cross-sectional detail on the line 6—6, Fig. 5, to be referred to; Fig. 7 is a side elevation of one of the jaws of the chuck, both the clamp therefor and the actuating member coöperating with said jaw being shown in section; Fig. 8 is a longitudinal sectional detail showing a modified form of jaw, to be referred to; Fig. 9 is a top plan view of a jaw and its facing, to illustrate a feature of my invention to be explained hereinafter.

In accordance with the present embodiment of my invention the chuck base 1 is a heavy and rigid metal disk, having a central opening 2 and provided at its back with a fixedly attached, internally threaded and circumferentially flanged collar 3, for the attachment of the chuck to the spindle of the grinding machine or other apparatus with which the chuck is to be used. This base provides a firm, unyielding support for the working parts of the chuck, the face of the base having projecting therefrom at right angles to heavy cheeks 4, 4, arranged in parallelism to each other and parallel to a diameter of the base, the rectangular space inclosed within the cheeks and the face of the base constituting a radial guideway for the jaws 5, 5. Each jaw is made as a solid, massive metal block, fitted to slide in the guideway with a close fit, the inner end of each jaw having a circularly curved seat 6 formed therein and extending from the top to the bottom of the jaw, for the reception of a detachable facing 7. Each facing is a cylindrical segment, and is secured in the jaw seat in any suitable manner, as by screws 8, Fig. 3, the segments being somewhat less than semi-cylinders, see Fig. 2, so that if the opposed ends of the jaws are abutted the facings will not touch each other. As shown in Fig. 3 the facing projects at 9 beyond the bottom of the jaw and extends into the central opening of the base, to prevent grit, abrading material or other foreign matter from entering in between the jaws and the bottom of the guideway. As the said guideway is open at the top, the tops of the jaws lying flush with the tops of the cheeks 4, it is important that the sliding fit between said cheeks and jaws shall be a close one, not only for the firm and rigid support of the jaws but also to admit the least possible amount of foreign matter to enter the guideway. Some fine grit will inevitably work in, and it is desirable to prevent any grinding action thereof upon the opposed surfaces of the jaws and cheeks, and for that purpose I preferably make a series of elongated, shallow pockets or depressions 10 in each side of the jaw, Fig. 7, running from top to bottom of the jaw. Any foreign matter which may work into the guideway will collect in the pockets, and will remain therein, so that grinding of the cheeks and the adjacent jaw faces is practically obviated. Each jaw has a transverse slot 11 formed therein at its top, protected and closed by a cover plate 12, for a purpose to be described, a socket 13 intersecting the bottom of each slot midway between its ends, and receiving a coiled spring 14 which acts upon a plunger 15, tending to force the plunger into the slot, as clearly shown in Figs. 3 and 4. The jaw clamping members coöperate with said plungers and with the bottoms of the slots, each clamping member comprising a cylindrical bar 16 having at opposite ends conical heads 17 and 18, the axes of said heads being alined but eccentric to the axis of the bar 16. One head, as 17, Fig. 4, is an integral part of the bar, and enters a frusto-conical seat 17ˣ in one of the cheeks 4, the other head 18 being rigidly attached to the bar by a screw 19 and entering the frusto-conical seat 18ˣ in the adjacent cheek 4, this construction enabling the parts to be assembled readily. Rotation of the clamping member is effected by a suitable tool applied to the polygonal extension 20 on the head 17, the bar 16 traversing the slot 11 of a jaw, and when said member is rotated the eccentricity of the bar 16 with relation to the conical heads will cause the bar to act first upon and depress the plunger 15, and then said bar will be forced against the bottom of the slot 11. This latter action clamps the jaw firmly and securely upon the bottom of the guideway, so that the jaw is held from movement therein, and at the same time the inclined surfaces of the heads 17 and 18 act upon their seats in the cheeks to draw the cheeks together to clamp the jaw between them. Said clamping means thus acts to clamp the jaws upon the bottom of the guideway, and also to clamp the jaw laterally between the cheeks.

When the clamping means is released, as shown in the drawings, the bar 16 is moved from engagement with the bottom of the slot 11, but the spring-plunger then acts to maintain the jaw seated yieldingly in the guideway, while permitting movement thereof longitudinally toward or from the center of the chuck. Inasmuch as the clamping means for one jaw is the duplicate of the means for clamping the other jaw, no further detailed description is necessary.

Before describing the means for actuating the jaws it may be stated that by making the jaw-facings 7 detachable, work varying considerably in external diameter can be handled by changing the jaw-facings, and while circularly curved facings are herein shown, for acting upon cylindrical work, it will be manifest that the work-engaging surfaces of the facings can be made to conform to the particular contour of the work to be held thereby.

I prefer to grind out slightly and thereby form an annular clearance 21 in the jaw-facings, between the inner and outer ends thereof, see Fig. 3, so that when the work is gripped in the chuck it will always be held positively and securely at the end portions of the facings. Should the work be slightly larger at its middle portions than adjacent its ends the clearance 21 prevents any tendency to tip or tilt the work out of axial alinement with the axis of rotation of the chuck, it being understood that in the drawing the clearance is exaggerated. An enlargement of a few thousandths of an inch in the external diameter of the work, between its ends, would tend to throw it out of alinement when gripped in the chuck were it not for the clearance in the middle portion of the jaw facings.

The bushing or other tubular piece of work may not be absolutely cylindrical externally, or it may have some slight surface irregularities which would prevent it from being centered with absolute accuracy when gripped in the chuck. To obviate this the seat 6 of the jaw may be ground to leave a clearance 22, Fig. 9, of a few thousandths of an inch between the seat and the back of the jaw-facing 23, shown as having lateral flanges 24 to abut against the end of the jaw. Now if the piece of work has irregularities the metal of the facings will stretch when the jaws are closed, and thereby accommodate themselves to the work, the clearance 22 permitting the stretching, and the work will be securely gripped and maintained in axial alinement with the center of the chuck. The stretch of the facings will be so slight, in any instance, as to be discovered by very delicate measuring instruments, the elasticity of the metal of the facing causing it to resume its normal curvature when the work is released.

In Fig. 8 I have shown a modified form of jaw, so arranged that the facing can tip or rock slightly in the direction of its length, to accommodate itself to work having a slight taper, whether the taper be intentional or otherwise. To this end the jaw is made in two parts 25, 26 the part 25 having means for clamping it such as previously described, the inner end of said part having a transverse seat 27 slightly more than semi-circular in cross-section, to receive and retain a rocking spindle 28. Said spindle is rigidly secured by one or more screws 29 to the jaw member 26, the latter having a concave seat for the detachable facing 7, which is held in position by screws 30, the construction of the facing being the same as is shown in Fig. 3.

Obviously the jaw member 26 and its attached facing can rock or tilt slightly on the spindle 28 as a fulcrum, so that the facing can accommodate itself to a tapered or irregular piece of work without lifting the main jaw member 25 from the bottom of the guideway therefor. A clearance is left between the face of the chuck base 1 and the jaw member 26 to permit the slight rocking motion of the latter.

It is supposed that the modified jaw shown in Fig. 8 corresponds to the lower one of the jaws 5 shown in Fig. 3, the spindle 28 being the equivalent of a rigid spindle 31, Figs. 1 to 5. This spindle passes through the lower one of the jaws, Fig. 3, and its projecting ends traverse elongated slots 32 in the cheeks, Fig. 5, and extend beyond said cheeks, to form trunnions for the adjacent ends of like links 33 outside the cheeks, and retained loosely on said trunnions by suitable washers, and cotter-pins 34.

The links form a part of the means for actuating the jaws to open and close them, the principal part of said means being a rotatable member having like cylindrical and axially alined journals 35, Fig. 5, which are rotatably mounted in opposite bearing apertures 36 in the cheeks, said journals being connected by a cylindrical body 37 offset or eccentric to the journals.

Projecting outwardly from each journal is an eccentric portion 38, said portions 38 being in axial alinement with each other but eccentric to the journals, and diametrically disposed with relation to the eccentric body 37 of the actuating member, as shown in Figs. 5 and 6. The diameter of the eccentric portions 37 and 38 is the same, and less than that of the journals, and the throw of the eccentric body 37 is the same as that of the eccentric portions 38, one of the latter having a polygonal head 39 firmly secured to it, so that the actuating member can be rotated readily by a suitable tool. The body 37 enters a transverse slot 40 formed in the outer end of the upper one of the jaws shown in Fig. 3, which slot is closed by a backing plate 41 set up and held in position by retaining screws 42, it being necessary to remove said plate when it is desired to disengage the adjacent jaw from the rotatable actuating member. Obviously, when the backing plate is set up and secured, rotation of the actuating member will cause the eccentric body 37 thereof to coöperate directly with the adjacent jaw and move it toward or from the center of the chuck, the extent of longitudinal movement of the jaw in the chuck guideway depending upon the angular movement of the actuating member. The links 33 are apertured to receive the eccentric portions 38, the head 39 holding one link in place, while a washer, and a cotter pin 43, retain the other link on its eccentric.

Remembering the equal but opposite eccentricity of the parts 37, 38 it will be evident that when the actuating member is rotated in the journal bearings 36 in the cheeks 4 one of the jaws 5 will be moved a certain distance by the eccentric 37, coöperating directly with the jaw, while the other jaw will be moved simultaneously an equal distance by the eccentrics 38, coöperating indirectly with such second jaw through the links 33 and trunnions of the spindle 31, but the jaws will be moved in opposite directions. Thereby the opening or closing movement of the jaws is effected, in a positive, rapid and powerful manner, and the jaws will be locked in any position by the eccentric portions of the actuating member. As the jaws are moved simultaneously, and equally, they are always equidistant from the center of rotation of the chuck, and thereby are self-centering with respect to the work to be held.

It is important to note that the maximum travel of the jaws is not great, and when the actuating member is given a half revolution from the position shown in Fig. 5, the jaws will be closed, and no further inward movement thereof can be effected, for a continued rotation of the actuating member will separate the jaws. This positive limitation of the closing movement of the jaws prevents any crushing or deforming of the work, for preferably the range of jaw movement is only sufficient to permit easy insertion and removal of the work when the jaws are opened, and to securely and rigidly grasp the work without crushing when the jaws are closed. The jaw actuating means is double-acting in operation, for it pushes one jaw and pulls the other, either in the opening or the closing operation, the slots 32 in the cheeks permitting the required movement of the jaw carrying the trunnion single 31. Such actuating means effects a strong and powerful movement of the jaws with a short stroke, and the short leverages of the eccentric portions of the rotatable member of said means enable the jaws to be set up with a relatively small expenditure of power.

It will be noted that when the jaws are open, as shown in Figs. 3 and 4, the rotatable actuator, that is, the member having the opposed eccentric portions, can be turned in either direction to close the jaws. The movement of the two jaws is absolutely equal and precise, and the work is always absolutely centered when the jaws are set up thereon, and this is true even if there are small variations in the diameter of different pieces of the same job, something which is apt to occur even with very careful workmanship. By making the jaw guideway deep I am enabled to use massive jaws, and it will be seen that the entire side face of each jaw is guided by the inner face of the adjacent cheek, preventing any shaking or chattering of the jaws relatively to the chuck base.

It will be seen by reference particularly to Fig. 3 that the power developed by the jaw actuating means is applied to each jaw at a point substantially midway between the top and bottom thereof, and such power is exerted upon the jaws in a plane parallel to the bottom of the guideway, and across the width of each jaw equally. This application of the power maintains the jaws properly seated, as there is no tendency to lift or tilt them from the bottom of the guideway, and also provides for the longitudinal movement of the jaws in exact parallelism with the side walls of the guideway without any lateral twisting or distortion.

Various changes or modifications in details of construction and arrangement may be made by those skilled in the art without departing from the spirit and scope of my invention as set forth in the claims hereunto annexed.

Having fully described my invention, what I claim as new and desire to secure by Letters Patent is:

1. In a chuck, a base having a guideway on its face, two jaws slidable longitudinally in said guideway and at opposite sides of the axial center of the chuck, and actuating means coöperating with said jaws to effect positive simultaneous and equal movement thereof toward and from the center of the chuck, said means including an actuator rotatably mounted in the side walls of the guideway.

2. In a chuck, a rotatable base having rigid cheeks projecting from its face parallel to each other and to a diameter of the base, to constitute a guideway, two jaws slidable longitudinally therein and located at opposite sides of the axial center of the chuck, and actuating means coöperating with both jaws to effect positive simultaneous and equal opening and closing movement thereof, said means including a member mounted rotatably in the cheeks and directly engaging one of the jaws.

3. In a chuck, a rotatable, rigid base having a guideway on its face, two jaws slidable longitudinally in the guideway toward and from the center of the chuck, and means to actuate the jaws and move them simultaneously and equally in the guideway toward and from each other, said means including an actuator rotatably mounted in the side walls of and crossing the guideway and in direct engagement with one jaw, and an indirect, positive connection between said member and the other jaw.

4. In a chuck, a rotatable base having an elongated guideway on its face intersected centrally by the axis of rotation of the chuck, oppositely movable jaws slidable longitudinally in the guideway at opposite sides of the axis of the chuck, and actuating means for the jaws mounted in the walls of said guideway above the plane of the base of said jaws, to effect positive, equal and simultaneous opening and closing movement thereof in the guideway, said means including a member extended transversely through and in direct engagement with one jaw and connected indirectly and positively with the other jaw.

5. The combination with the base of a chuck having a deep guideway on its face symmetrical with relation to the axis of rotation of the chuck, and oppositely movable jaws slidably mounted in the guideway, of self-locking jaw actuating means including a rotatable actuator mounted transversely of the guideway above the plane of the base of said jaws and coöperating indirectly and positively with the other jaw, to impart equal and simultaneous movements to the jaws in opposite directions.

6. The combination with the rotatable base of a chuck having integral, parallel cheeks on and at right angles to its face to constitute a guideway intersected centrally by the axis of rotation of the chuck, of oppositely movable jaws slidable longitudinally in the guideway toward and from the axis of the chuck, and jaw actuating means comprising a member crossing the guideway and rotatably mounted in the cheeks, diametrically opposite eccentric portions of equal throw on said member, one of said eccentric portions coöperating directly with one of the jaws to effect longitudinal movement thereof in the guideway, and links coöperating with the other eccentric portion of said member and connected with the second jaw to effect longitudinal movement thereof, whereby rotation of said member effects positive, simultaneous and equal movement of the jaws toward or from each other.

7. The combination, in a chuck, of a disklike base having rigid parallel cheeks on its face at right angles thereto, to constitute a deep guideway, jaws slidably mounted in the guideway at opposite sides of the chuck axis, means to clamp the jaws in the guideway, and jaw actuating means, including a member rotatably mounted in the cheeks and operatively connected with both the jaws to effect positive simultaneous and equal movement thereof toward and from the axis of the chuck.

8. The combination, in a chuck, of a base having parallel cheeks projecting from its face to constitute a guideway, opposed work-holding jaws slidable in the guideway, and actuating means for the jaws coöperating therewith substantially midway between the top and bottom faces thereof, to effect positive, simultaneous and equal movement of the jaws toward and from each other, said means including an actuator rotatably mounted in the cheeks and having equal but oppositely disposed eccentric portions one of which portions engages directly and internally one jaw, and positive connections between the other of such eccentric portions and the other jaw, rotation of said actuator causing positive simultaneous and equal movement of the jaws to open or close the same, the eccentric portions of said actuator locking the jaws in any desired position.

9. The combination, in a chuck, of a base having parallel cheeks projecting from its face to constitute a guideway, work-holding jaws slidable in the guideway, actuating means to effect equal, positive and simultaneous movement of the jaws toward and from each other, and a clamping device for each jaw, to clamp the jaw upon the bottom of the guideway and between the cheeks thereof.

10. In a chuck, a base having parallel cheeks projecting at right angles to its face, to constitute a guideway, oppositely movable jaws therein, a clamping member for each jaw rotatably mounted in the cheeks and having an eccentric portion to engage the jaw between the cheeks and clamp the jaw upon the bottom of the guideway.

11. In a chuck, a base having parallel cheeks projecting at right angles to its face, to constitute a guideway, oppositely movable jaws therein, a clamping member for each jaw having coaxial heads rotatably mounted in the cheeks, and an intervening eccentric portion to engage the jaw between the cheeks and force it against the bottom of the guideway.

12. In a chuck, a base having parallel cheeks projecting at right angles to its face, to constitute a guideway, oppositely movable jaws therein, a clamping member for each jaw, rotatably mounted in the cheeks and having an eccentric portion to positively engage the jaw and clamp it, and means interposed between the jaw and the clamping member to maintain the jaw yieldingly seated in the guideway when the clamping member is inactive.

13. In a chuck, a base having parallel cheeks projecting at right angles to its face, to constitute a guideway, oppositely movable jaws therein, and means coöperating yieldingly with each jaw to maintain it seated in the guideway when unclamped and coöperating positively with the jaw to clamp it from movement in the guideway.

14. In a chuck, a base having parallel cheeks projecting at right angles to its face, to constitute a guideway, oppositely movable jaws therein, means including an actuator rotatably mounted in the cheeks, to effect positive and equal movement of the jaws toward and from the axis of the chuck, and a clamping member for each jaw, rotatably mounted in the cheeks and having an eccentric portion to engage the jaw between the cheeks and clamp the jaw upon the bottom of the guideway.

15. In a chuck, a base having parallel cheeks projecting at right angles to its face, to constitute a guideway, oppositely movable jaws therein, means coöperating with said jaws to effect positive, simultaneous and equal movement thereof toward or from the axis of the chuck, and a clamping member for each jaw, having conical co-axial heads rotatably mounted in the cheeks, and an intervening eccentric portion to engage the jaw between the cheeks and force it against the bottom of the guideway.

16. In a chuck, a base having parallel cheeks projecting at right angles to its face, to constitute a guideway, oppositely movable jaws therein, means coöperating with said jaws to effect positive, simultaneous and equal movement thereof toward or from the axis of the chuck, a clamping member for each jaw, rotatably mounted in the cheeks and having an eccentric portion to positively engage the jaw and clamp it, and means interposed between the jaw and the clamping member to maintain the jaw yieldingly seated in the guideway when the clamping member is inactive.

17. In a chuck, a base having parallel cheeks projecting at right angles to its face, to constitute a guideway, oppositely movable jaws therein, means coöperating with said jaws to effect positive, simultaneous and equal movement thereof toward or from the axis of the chuck, and means coöperating yieldingly with each jaw to maintain it seated in the guideway when unclamped and coöperating positively with the jaw to clamp it from movement in the guideway.

18. In a chuck, having movable jaws, a transversely concave facing detachably mounted on each jaw at the inner end thereof, to engage the work, each facing having its central portion recessed to present a segmental clearance and means to effect equal and simultaneous movement of the jaws toward or from each other.

19. In a chuck, having movable jaws, a transversely concave facing on the inner end of each jaw, the facing having a segmentally recessed portion between its top and bottom, to provide a clearance thereat between the work and the facing, whereby the work is engaged positively at the top and bottom portions of the facing, and means to effect simultaneous and equal movement of the jaws toward and from each other.

20. In a chuck, having radially movable jaws, and transversely concave facings on the jaws to engage the work, said facings being recessed to provide an annular clearance between the work and the facings substantially midway between the ends thereof.

21. In a chuck, a centrally apertured base having a guideway on its face, jaws radially movable in the guideway toward and from the center of the chuck, each jaw having a transversely concave seat in its inner end, and a facing made as a segment of a cylinder mounted in each jaw seat, the lower end of the facing extending into the aperture of the base to prevent the entrance of foreign matter to the bottom of the guideway.

22. In a chuck, a centrally apertured base having a guideway on its face, jaws radially movable in the guideway toward and from the center of the chuck, each jaw having its side walls provided with a plurality of shallow pockets parallel to the end of the jaw, to collect foreign matter entering between the jaws and the side walls of the guideway, and thereby prevent wear of such parts, and a facing mounted on the inner end of each jaw and extended into the aperture of the base, to shield the bottom of the guideway from the entrance of grit.

23. In a chuck a base having a guideway, a jaw movable therein, said jaw having on its opposite sides a series of elongated, shallow pockets parallel to the ends of the jaws, to receive and retain foreign matter and prevent wear of the jaw side upon an adjacent guiding surface of the chuck.

24. In a self-centering chuck, in combination, a base having cheeks thereon constituting a guideway, jaws movable therein toward and from the center of the base, and means to effect movement of said jaws simultaneously and equally in opposite directions, said means mounted in said cheeks above the plane of the base of said jaws coöperating separately with each jaw at the same distance above the bottom of the guideway and acting upon the jaw in a plane parallel to the bottom of the guideway.

25. In a self-centering chuck, in combination, a base having cheeks thereon constituting a guideway, jaws movable therein toward and from the center of the base, and jaw actuating means mounted in said cheeks above the plane of the base of said jaws coöperating directly with one, and indirectly with the other of said jaws, in a plane parallel to the bottom of the guideway, to effect simultaneous and equal movement of the jaws toward or from each other, said means being applied to each jaw across the width thereof.

In testimony whereof, I have signed my name to this specification in the presence of two subscribing witnesses.

EDWARD RIVETT.

Witnesses:
JOHN C. EDWARDS,
THOMAS J. DRUMMOND.

Copies of this patent may be obtained for five cents each, by addressing the "Commissioner of Patents, Washington, D. C."